US005625890A

United States Patent [19]

Swift

[11] Patent Number: 5,625,890
[45] Date of Patent: Apr. 29, 1997

[54] LOGGING RECORDER SYSTEM FOR TRUNKING RADIO

[75] Inventor: Carl J. Swift, Houston, Tex.

[73] Assignee: Swift Computers, Inc., Houston, Tex.

[21] Appl. No.: 562,643

[22] Filed: Nov. 27, 1995

Related U.S. Application Data

[63] Continuation of Ser. No. 85,124, Jun. 29, 1993, abandoned.

[51] Int. Cl.$^6$ .............................. H04B 17/00; H04Q 7/28
[52] U.S. Cl. .......................... 455/67.1; 455/9; 455/18; 455/53.1; 369/7; 369/49
[58] Field of Search .................................. 455/9, 18, 53.1, 455/54.1, 56.1, 67.1, 67.7; 340/825.06; 300/32; 369/6, 7, 48, 49, 61, 98; 379/45, 73, 84, 85

[56] References Cited

U.S. PATENT DOCUMENTS

| | | |
|---|---|---|
| 684,641 | 10/1901 | Kaufmann . |
| 684,999 | 10/1901 | Mead . |
| 3,575,558 | 4/1971 | Leyburn . |
| 3,806,804 | 4/1974 | Mills et al. . |
| 3,882,457 | 5/1975 | En . |
| 3,898,390 | 8/1975 | Wells et al. . |
| 4,012,597 | 3/1977 | Lynk, Jr. et al. . |
| 4,013,843 | 3/1977 | Lupattelli et al. . |
| 4,055,832 | 10/1977 | En . |
| 4,188,508 | 2/1980 | Rogers et al. . |
| 4,271,520 | 6/1981 | Coombes et al. . |
| 4,312,070 | 1/1982 | Coombes et al. . |
| 4,352,955 | 10/1982 | Kai et al. . |
| 4,517,669 | 5/1985 | Freeburg et al. . |
| 4,519,068 | 5/1985 | Krebs et al. . |
| 4,553,262 | 11/1985 | Coe . |
| 4,577,060 | 3/1986 | Webb et al. . |
| 4,590,473 | 5/1986 | Burke et al. . |
| 4,594,591 | 6/1986 | Burke . |
| 4,612,415 | 9/1986 | Zdunek et al. . |
| 4,637,022 | 1/1987 | Burke et al. . |
| 4,654,777 | 3/1987 | Nakamura . |
| 4,658,435 | 4/1987 | Childress et al. . |
| 4,679,244 | 7/1987 | Kawasaki et al. . |
| 4,684,941 | 8/1987 | Smith et al. . |
| 4,692,945 | 9/1987 | Zdunek . |
| 4,701,944 | 10/1987 | Howard et al. . |
| 4,716,407 | 12/1987 | Borras et al. . |
| 4,718,108 | 1/1988 | Davidson et al. . |
| 4,723,264 | 2/1988 | Sasuta et al. . |
| 4,891,835 | 1/1990 | Leung et al. ...................... 379/73 X |
| 5,392,449 | 2/1995 | Shaughnessy et al. . |

Primary Examiner—Chi H. Pham
Attorney, Agent, or Firm—Fish & Richardson P.C.

[57] ABSTRACT

A logging recorder system for trunking radio includes a device which monitors a plurality of channels of the trunking radio system and outputs analog signals representative thereof. A digitizer is then provided for digitizing the analog signals, and a controller breaks the digitized signals into segments and stores the segments on a mass storage device. The controller also generates an index of locations of the segments on the mass storage device. The controller may then be used to selectively play back a desired conversation by automatically combining segments from the mass storage device based on the index.

22 Claims, 4 Drawing Sheets

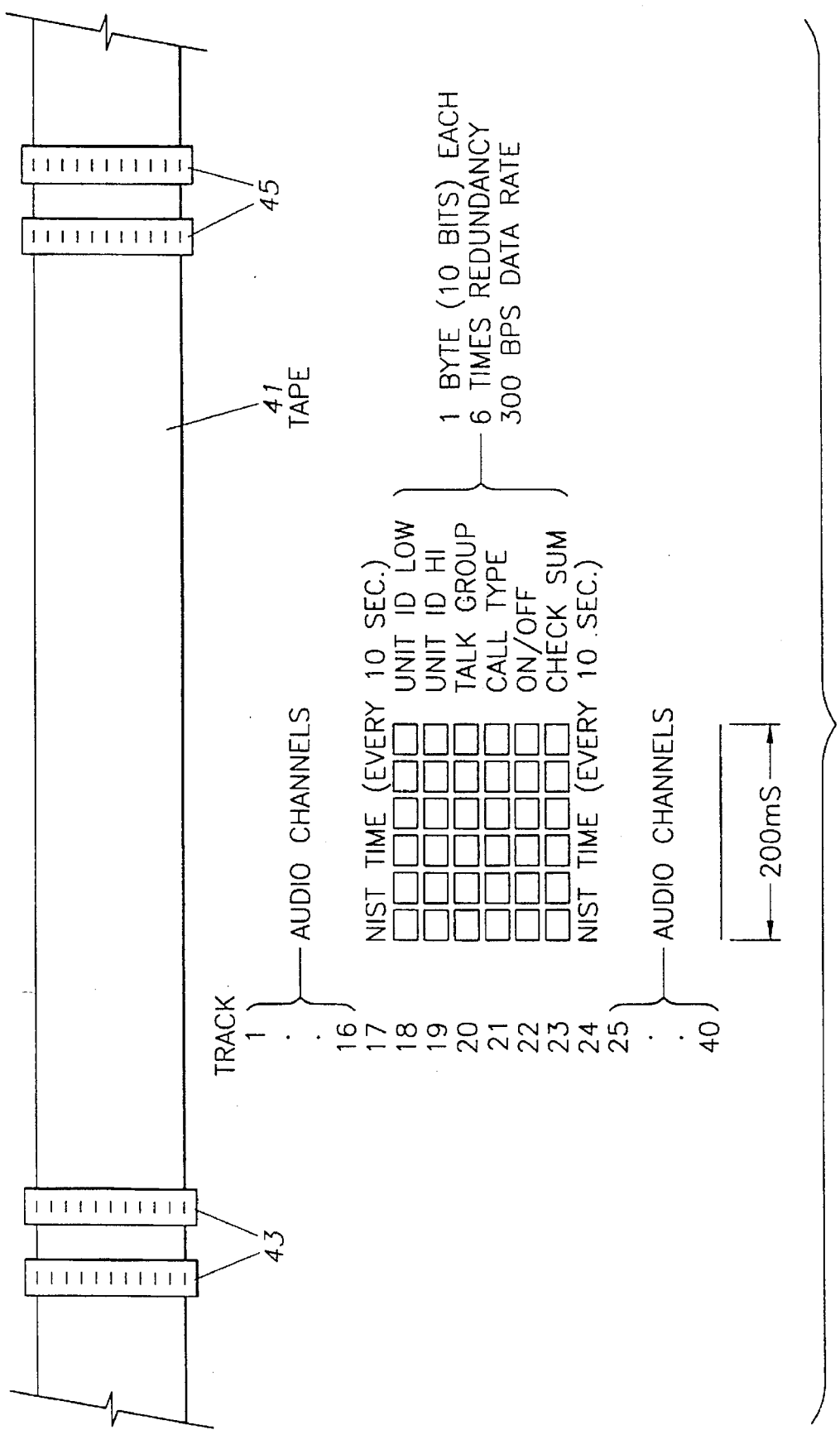

| TRACK | ASSIGNMENT |
|---|---|
| 1 | REPEAT. #1, 855.9125, CH. #196 |
| 2 | REPEAT. #2, 855.1875, CH. #167 |
| 3 | REPEAT. #3, 854.9375, CH. #157 |
| 4 | REPEAT. #4, 855.6375, CH. #185 |
| 5 | REPEAT. #5, 854.9125, CH. #156 |
| 6 | REPEAT. #6, 860.3625, CH. #374 |
| 7 | REPEAT. #7, 859.3625, CH. #334 |
| 8 | REPEAT. #8, 858.3625, CH. #294 |
| 9 | REPEAT. #9, 857.3625, CH. #254 |
| 10 | REPEAT. #10, 856.3625, CH. #214 |
| 11 | REPEAT. #11, 855.1625, CH. #166 |
| 12 | REPEAT. #12, 860.3375, CH. #373 |
| 13 | REPEAT. #13, 859.3375, CH. #333 |
| 14 | REPEAT. #14, 858.3375, CH. #293 |
| 15 | REPEAT. #15, 857.3375, CH. #187 |
| 16 | REPEAT. #16, 856.3375, CH. #176 |
| 17 | NIST TIME (EVERY 10 SECONDS) |
| 18 | UNIT ID (LOW BYTE) |
| 19 | UNIT ID (HIGH BYTE) |
| 20 | TALK GROUP (BYTE) |
| 21 | CALL TYPE/ON/OFF (BYTE) |
| 22 | CHANNEL ASSIGNMENT (BYTE) |
| 23 | CHECK SUM (BYTE) |
| 24 | NIST TIME (EVERY 10 SECONDS) |
| 25 | REPEAT. #17, 855.4125, CH. #253 |
| 26 | REPEAT. #18, 855.8625, CH. #213 |
| 27 | REPEAT. #19, 855.1125, CH. #194 |
| 28 | REPEAT. #20, 855.6875, CH. #164 |
| 29 | CONVENT. REPEATER AUDIO |
| 30 | CONVENT. REPEATER AUDIO |
| 31 | CONVENT. REPEATER AUDIO |
| 32 | CONVENT. REPEATER AUDIO |
| 33 | CONVENT. REPEATER AUDIO |
| 34 | CONVENT. REPEATER AUDIO |
| 35 | CONVENT. REPEATER AUDIO |
| 36 | CONVENT. REPEATER AUDIO |
| 37 | CONVENT. REPEATER AUDIO |
| 38 | CONVENT. REPEATER AUDIO |
| 39 | CONVENT. REPEATER AUDIO |
| 40 | CONVENT. REPEATER AUDIO |

FIG.4

LOGGING RECORDER SYSTEM FOR TRUNKING RADIO

This application is a file wrapper continuation of U.S. application Ser. No. 08/085,124, filed Jun. 29, 1993, now abandoned.

FIELD OF THE INVENTION

The invention relates to a logging recorder system. More particularly, the invention relates to a logging recorder system for digitizing and logging a trunking radio and for selectively de-trunking and playing back desired information.

BACKGROUND OF THE INVENTION

Trunking radio systems are widely used in dispatch applications today. A basic trunking radio system is described in U.S. Pat. No. 4,012,597 assigned to Motorola, Inc., and more recent examples of trunking radio systems are disclosed in U.S. Pat. Nos. 4,612,415, 4,692,945, and 4,723,246, all assigned to Motorola, Inc. Because these systems are well-known, the operational details of trunking radio will not be described herein. However, the conceptual basis of a trunking radio is illustrated in prior art FIG. 1.

A typical trunking radio system includes a plurality of subscriber stations 1A–1C, a centrally located repeater 3, and a control station 5. While only three subscriber stations are shown in FIG. 1, there will be typically be many times this number in an actual system. The trunking radio system maintains communication between each subscriber station and the control station 5, as well as between individual subscriber stations. Because the number of channels allotted to the system is typically much smaller than the number of subscriber stations, the control station 5 assigns channels for communications on an as-needed basis.

Channel assignment is typically achieved as follows. One of the subscriber stations initiates a communication on the system by transmitting a channel request to the control station 5 on a predetermined control frequency. The request includes that station's ID and talk group, and is known as the Inbound Signalling Word (ISW). (A talk group is a group of stations with a common interest, such as all of the members of a certain repair team, etc.). The control station 5 responds to the subscriber station via the control channel with an Outbound Signalling Word (OSW) which authorizes the subscriber station to operate on an assigned channel. Thus, the control station 5 knows the identity of the subscriber station which initiated the contact, its talk group, and the channel to which the communication is assigned. The controller station then instructs the other subscriber stations within the initiating station's talk group to receive on the assigned frequency. When the communication is complete, the channel is released and becomes available to control station 5 for further assignment. Thus, a response to the initiating subscriber station from one of the other stations in the talk group is likely to be assigned to a different channel than the one to which the original communication was assigned. When a response is initiated, the control station 5 advises all stations within the talk group of the new channel assignment.

As a result of the above-described arrangement, when, for example, fifty or more talk groups are on the trunking radio system (each of which includes a number of individual stations) each channel carries a virtually constant stream of small segments from unrelated conversations. While the subscriber stations can follow the conversation by switching channels in accordance with the control information, it is impossible to follow any one conversation by monitoring any one of the channels.

It is frequently desirable to maintain a log of all transmissions over a dispatch radio system. For example, when the dispatch system is used for emergency response, it is often desirable to retrieve the original dispatch information and the content of conversations between the dispatched units. With a trunking radio system, however, this is very difficult. The reason for the difficulty is that if one were to simply back up the data on each channel, it would be impossible for the reasons explained above to reproduce any one complete conversation from any one of the channels. On the other hand, recording the conversations of each talk group individually is economically unfeasible because it would require a number of receivers and storage devices equal to the number of talk groups. Clearly, it is not practical to have a separate receiver and recorder for each talk group. Thus, prior to the present invention, there was no economically feasible way in which trunking radio systems could be logged for future retrieval of data.

SUMMARY OF THE INVENTION

The present invention overcomes the above-described disadvantages in the prior art by providing a logging recorder system which records communications made over the trunking radio system in "trunked" form and has the ability to selectively play back and "de-trunk" any desired conversation in its entirety.

Particularly, in one embodiment, the invention relates to a digital logging system, comprising: a plurality of fixed frequency radios each of which monitors a selected channel of a trunking radio system; a controller which monitors the fixed frequency radios and records selected segments of outputs thereof on a mass storage device in indexed fashion; and means for playing back a desired conversation by automatically combining said segments based on the index.

In another embodiment, the invention relates to a digital logging recorder for a trunking radio system, comprising: means for monitoring a plurality of channels of the trunking radio system and outputting analog signals representative thereof; means for digitizing the analog signals; control means for breaking the digitized signals into segments and storing the segments on a mass storage device; means for generating an index of locations of the segments on the mass storage device; and means for playing back a desired conversation by automatically combining segments from the mass storage device based on the index.

In a further embodiment, the invention relates to a method of logging a digital trunking radio system, comprising the steps of: monitoring a plurality of channels of the trunking radio system and outputting analog signals representative thereof; converting the analog signals to digital signals; breaking the digital signals into segments and appending ID information into the segments; storing the segments on a mass storage device and generating an index of storage locations of the segments; and selectively playing back a desired conversation by automatically combining segments from the mass storage device using the index.

BRIEF DESCRIPTION OF THE DRAWINGS

FIG. 3 is a diagram illustrating the tape track configuration according to a preferred embodiment of the invention;

FIG. 4 is a table showing an exemplary recorder track assignment scheme in accordance with the preferred embodiment of FIG. 3.

DESCRIPTION OF THE PREFERRED EMBODIMENT

A preferred embodiment of the invention will now be described with reference to the accompanying figures.

Figure 1:
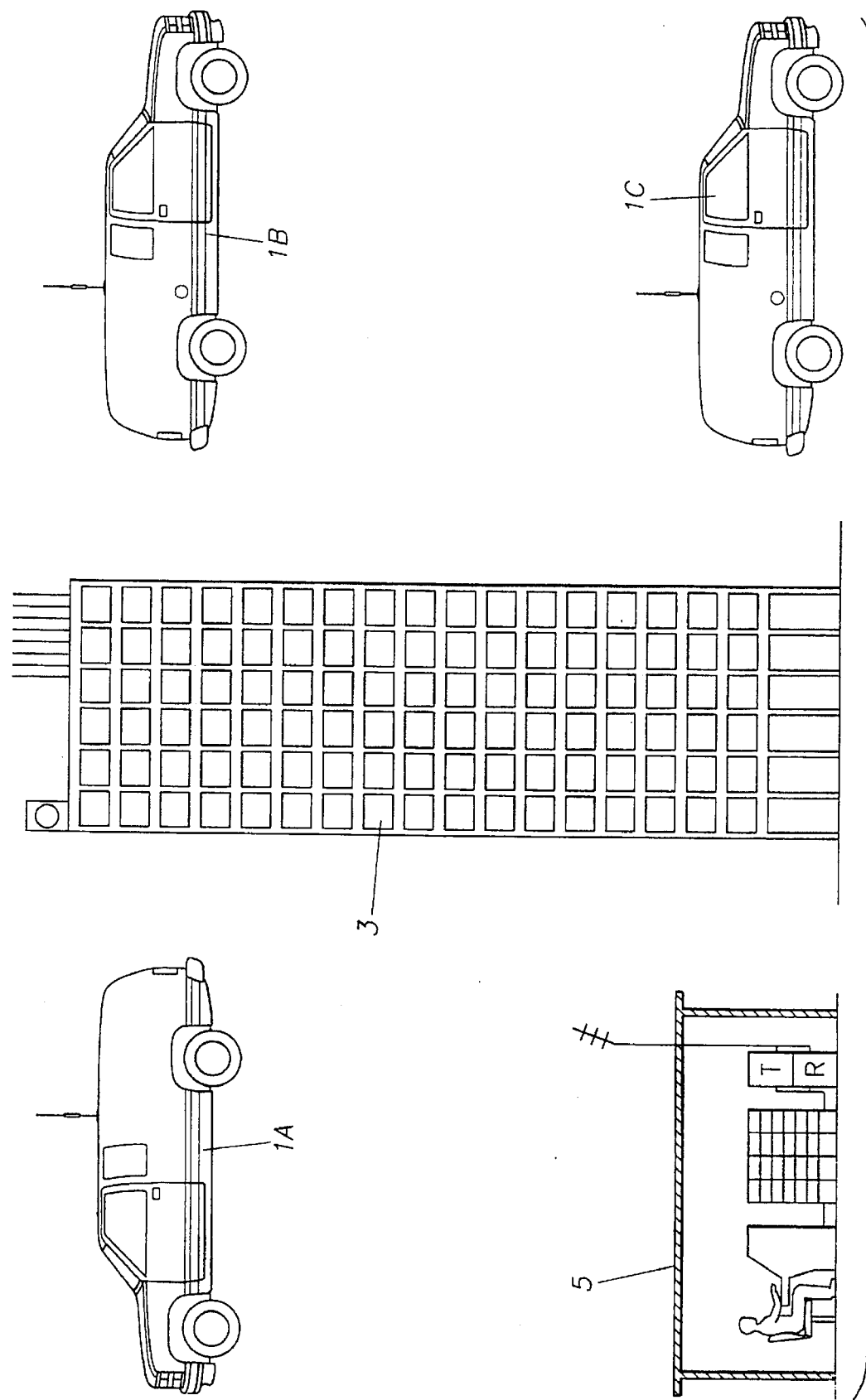
FIG. 1 is a stylized drawing illustrating a typical prior art trunking radio system.
Figure 2:
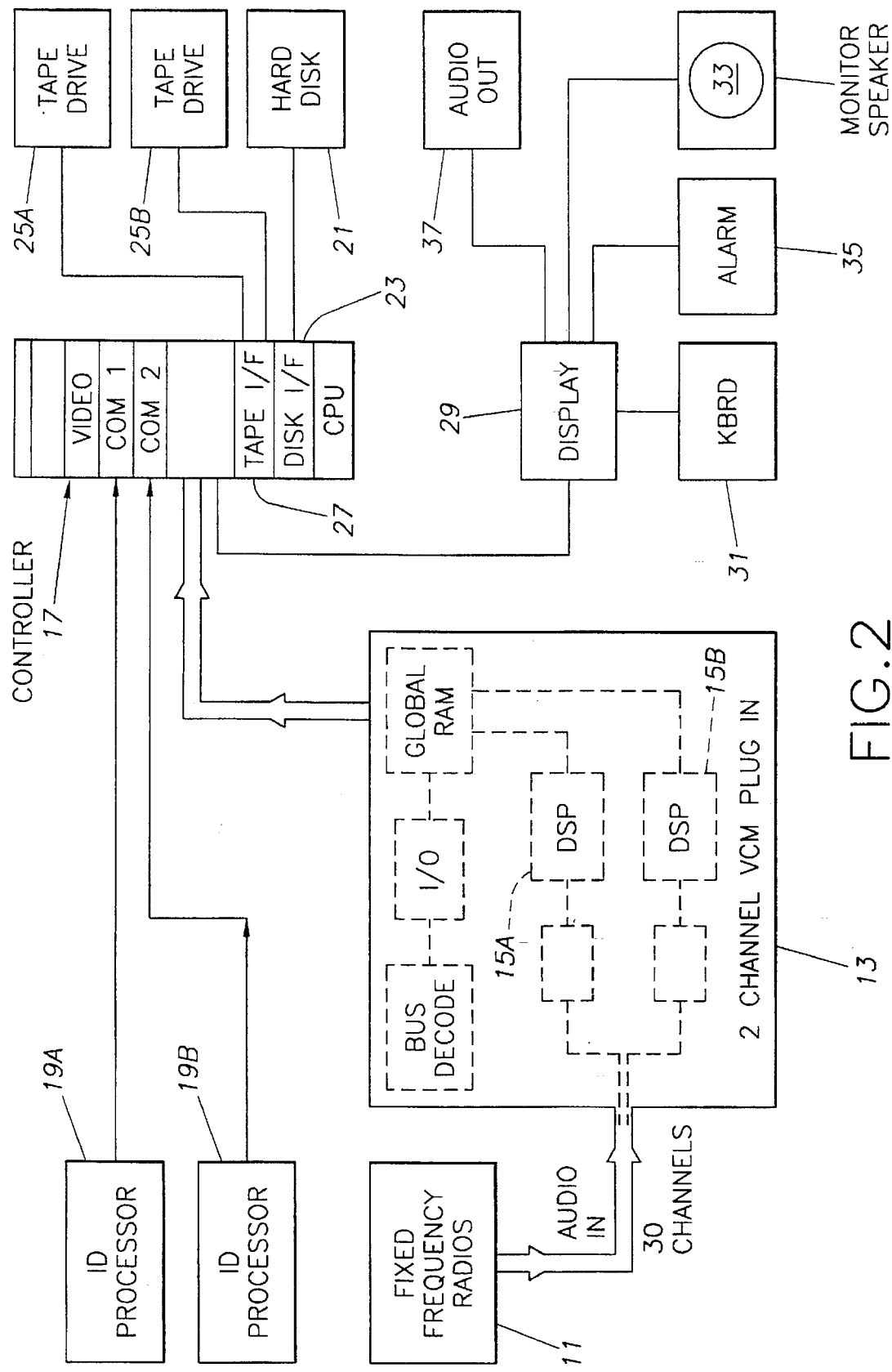
FIG. 2 is a block diagram illustrating a preferred embodiment of the present invention.

A block diagram of a preferred embodiment is illustrated in FIG. 2. In this embodiment, fixed frequency radios 11 are provided for each of the trunking channels which, in the example, is thirty channels. The audio outputs of the fixed frequency radios 11 are applied to voice coding module (VCM) boards 13, each of which handles two channels. Although only one VCM is shown in the figure, in the preferred embodiment 16 VCM boards are provided.

Each VCM board includes an A channel and a B channel which digitize the respective audio input channels and then apply a DSP compression algorithm to compress the data to 9600 or 4800 baud. The DSP 15A,15B for the A and B channels are, for example, the Texas Instruments TMS320C30/31 digital signal processor. The output of VCM 13 is then applied to a controller 17.

ID processors 19A,19B maintain a list of subscriber station and talk group IDs. Based on the channel assignment information received over the control channel, the controller 17 cross-references the channel number assignment to an internal channel number, and then monitors the digitized, compressed data input to the controller from the appropriate VCM channel.

Controller 17 takes individual segments of data from the selected channel (e.g., segments one second in length), appends a header indicating the time, the subscriber station ID, and talk group ID, and stores the segments on a hard disk 21 via a disk interface 23. Controller 17 continues this operation for each one second segment of data on each of the selected trunking channels. As data is written to hard disk 21, an index is created to allow efficient retrieval of data.

The hard disk 21 preferably has a capacity of approximately one hour (although this is highly dependent on radio activity). When this capacity is reached, controller 17 dumps the contents of hard disk 21 to dual tape drives 25A,25B via tape interface 27. Tape drives 25A,25B are preferably each eight millimeter 2.5 Gigabyte tape drives, and hard disk 21 is preferably a 330 Megabyte disk.

Operator interface for the system is provided by an alphanumeric display 29 and keyboard 31. A monitor speaker 32 is provided to allow the operator to monitor a desired talk group. An alarm 35 is also provided to indicate any failures or errors in the system. Audio out terminal 37 is provided to allow recording of audio played back by the system in the manner described below.

When it is desired to play back a desired conversation, the system asks the user to specify the talk group, unit IDs, or the channel, and to select a date/time range for the search. A display is then provided which indicates the activity found meeting the specifications during the time period selected. The user may then select playback of a desired conversation in one of two formats: actual rate (transmissions spaced as they actually occurred); or compressed rate (transmissions spaced with a two second pause in between). During play back, the operator has the option to pause the play back, stop the play back, search forward (2×), search backward (2×), rewind to the start of the file, fast forward to the end of the file, and play. The system is able to retrieve a desired segment from hard disk 21 if it is within an hour of the original transmission, or from tape drives 25A,25B at a later point in time. Both of these operations can be done at the same time the system continues to record new transmissions. Thus, a play back request does not interrupt the continued logging of the trunking radio system.

Preferably, the system is provided with a remote play back operation wherein an internal card permits remote access to the system from a properly equipped personal computer. When this option is provided, a remote authorized user can issue search commands for and play a conversation that meets specified criteria, and receive the requested information in either digital or analog format.

An exemplary tape track configuration is shown in FIG. 3, and an exemplary recorder track assignment scheme is shown in the table of FIG. 4. Tape 41 is forty track tape, and two twenty track record heads 43 and two twenty track play back heads 45 are provided. The recorder tracks are then assigned in a desired manner. In the exemplary recorder track assignment of FIG. 4, tracks 1–16 and 25–40 are assigned to audio channels. Track 17 and 24 are assigned to NIST time (every ten seconds). Tracks 18 and 19 contain unit ID information, while talk group information is stored on track 20. Track 21 contains call type information, track 22 contains channel assignment information, and track 23 contains check sum information. This arrangement allows efficient retrieval of data based on any number of search criteria.

As is apparent from the above, the invention provides the ability to log and selectively play back data from a trunking radio system in an economically feasible manner. Thus, the necessity of having a large number of receivers and recorders is obviated. At the same time, high quality audio play back of any desired segment of information can be achieved by accessing the user-friendly play back feature of the invention.

While various embodiments of the invention are shown and described, the invention is not limited thereto, but rather is limited only by the scope of the appended claims.

What is claimed is:

1. A logging recorder for a trunking radio system having a plurality of channels, wherein one of said channels carries channel assignment information and each of the others of said channels for carrying streams of segments from unrelated conversations, comprising:

a plurality of fixed frequency radios each of which monitors a selected one of said plurality of channels;

a controller which monitors said fixed frequency radios and generates identification information corresponding to said segments for each particular conversation based upon said channel assignment information; and means for storing said segments and said identification information on a mass storage device.

2. A logging recorder as claimed in claim 1, further comprising means for playing back a desired conversation by automatically retrieving and combining appropriate ones of said segments based upon said identification information.

3. A logging recorder as claimed in claim 1, further comprising means for digitizing selected outputs of said fixed frequency radios.

4. A logging recorder as claimed in claim 3, further comprising means for compressing the digitized selected outputs.

5. A logging recorder as claimed in claim 1, wherein said identification information is appended to a corresponding one of said segments prior to storage.

6. A logging recorder as claimed in claim 1, wherein said identification information comprises a channel identifier.

7. A logging recorder as claimed in claim 1, wherein said identification information comprises a user identifier.

8. A logging recorder as claimed in claim 1, wherein said identification information comprises a talk group identifier.

9. A logging recorder as claimed in claim 1, wherein said identification information comprises a time identifier.

10. A logging recorder as claimed in claim 1, wherein said identification information comprises a channel identifier, a talk group identifier, and a time identifier.

11. A logging recorder as claimed in claim 5, wherein said identification information comprises a channel identifier.

12. A logging recorder as claimed in claim 5, wherein said identification information comprises a user identifier.

13. A logging recorder as claimed in claim 5, wherein said identification information comprises a talk group identifier.

14. A logging recorder as claimed in claim 5, wherein said identification information comprises a time identifier.

15. A logging recorder as claimed in claim 5, wherein said identification information comprises a channel identifier, a talk group identifier, and a time identifier.

16. A logging recorder as claimed in claim 1, wherein said mass storage device comprises a hard drive.

17. A logging recorder as claimed in claim 1, wherein said mass storage device comprises magnetic tape.

18. A digital logging recorder for a trunking radio system having a plurality of channels, wherein one of said channels carries channel assignment information and each of the others of said channels is for carrying streams of segments from unrelated conversations, comprising:

means for monitoring the plurality of channels and outputting analog signals representative thereof;

means for digitizing selected ones of said analog signals;

control means for monitoring the digitized signals and generating identification information corresponding to said segments for each particular conversation based upon said channel assignment information; and means for storing said segments and said identification information on a mass storage device.

19. A logging recorder as claimed in claim 18, further comprising means for playing back a desired conversation by automatically retrieving and combining appropriate ones of said segments based upon said identification information.

20. A method of logging a trunking radio system having a plurality of channels, wherein one of said channels carries channel assignment information and each of the others of said channels is for carrying streams of segments from unrelated conversations, comprising the steps of:

monitoring said plurality of channels;

generating identification information corresponding to said segments for each particular conversation based upon said channel assignment information; and storing said segments and said identification information on a mass storage device.

21. The method of claim 20, further comprising the step of converting the segments to digital signals.

22. The method of claim 20, further comprising the step of appending said identification information to a corresponding one of said segments.

* * * * *

UNITED STATES PATENT AND TRADEMARK OFFICE
CERTIFICATE OF CORRECTION

PATENT NO. : 5,625,890

DATED : April 29, 1997

INVENTOR(S) : Carl J. Swift

It is certified that error appears in the above-identified patent and that said Letters Patent is hereby corrected as shown below:

Column 4, line 46, insert --is-- after "channels".

Signed and Sealed this

Eighth Day of July, 1997

Attest:

BRUCE LEHMAN

*Attesting Officer*  *Commissioner of Patents and Trademarks*